3,305,536
POLYSULFIDE POLYMERS
Paul F. Warner, Phillips, Tex., assignor to Phillips Petroleum Company, a corporation of Delaware
No Drawing. Filed Aug. 5, 1963, Ser. No. 300,079
10 Claims. (Cl. 260—79.7)

This invention relates to novel polysulfide polymers and a process of producing same. In one aspect this invention relates to a novel method for producing cross-linked polysulfide polymers by in situ cross linking.

Linear polysulfide polymers are well known in the art, and various processes are known for their production. However, polysulfide polymers of dimercaptans prepared by oxidation of monomer with either sulfur, oxygen, or an oxygen carrier such as peroxide, are linear in nature, varying only in chain length depending on the method of preparation. Linear polymers are, in general, soluble in organic solvents. Thus, strictly linear polysulfide polymers are not too acceptable in certain applications, such as for sealing compounds in airplane wing tanks, gasoline hose formulations and the like due to their solubility characteristics. For these applications it is desirable to provide a polymer characterized by reduced solubility.

Accordingly, it is an object of this invention to provide novel cross-linked polysulfide polymers.

Another object of this invention is to provide a process for the preparation of cross-linked polysulfide polymers.

Other objects, advantages and features of the invention will be readily apparent to those skilled in the art from the following description and the appended claims.

I have now discovered that novel cross-linked polysulfide polymers having a reduced solubility are produced when the cross-linking agent is formed in situ by adding to the polymerization reaction mixture phosphorus trihalide followed by the addition of an oxidizing agent and a catalyst. The degree of cross-linking is controlled by the amount of phosphorus trihalide added.

More specifically, the cross-linking agent is formed in situ by adding P(X)$_3$, wherein X is Cl, Br, F, I, to the dimercaptan while heating gently. As soon as the reaction has ceased, as evidenced by the HCl evolution ceasing, the oxidizing agent such as sulfur and catalyst are added and the polymerization is then continued until the desired viscosity is achieved. The sulfur added serves to oxidize the mercaptan.

The novel polymer compositions of this invention are represented by the following formula:

$$\text{HSRS—P—SRS(S)}_x\text{SR—S[(S)}_x\text{S—R—S]}_y\text{—P—S—R—S—H}$$

with pendant S—R—SH and (S)$_x$—S—R—S—P—S—R—SH groups wherein R is an organo radical containing up to and including 20 carbon atoms, and x is an integer from 0 to 6 and y is an integer from 0 to 20.

According to the invention, PCl$_3$ is slowly added to the dimercaptan in an amount to give the desired cross-linking and corresponding reduced solubility while the mixture is heated at 100° to 140° F. until the evolution of HCl has stopped. The mixture comprising cross-linked dimercaptans and unreacted dimercaptans due to having an excess of dimercaptan are then contacted with an oxidizing agent, preferably free sulfur, in the presence of a catalyst, preferably an amine, at a temperature in the range of 0 to 500° F. to form a cross-linked polysulfide polymer, and the polymer is recovered as a product of the process.

The mercaptans which can be employed according to the invention can be represented by the formula $$\text{HS—R—SH}$$

wherein R is an organic radical containing up to and including 20 carbon atoms per molecule. The hydrocarbon dimercaptans and especially the cyclic hydrocarbon dimercaptans as exemplified by 2,9-p-methane dithiol are preferred. In the above formula R can be a hydrocarbon radical, such as aliphatic, cycloaliphatic, aryl and the like, or a heterocyclic structure such as:

[N, O, and S heterocyclic ring structures]

as well as other organic radicals such as where alkyl radicals are substituted for hydrogen in these radicals.

Representative examples of suitable dimercaptan compounds that can be employed according to the invention include: dimercapto ethane, dimercapto propane, 1,5-dimercapto pentane, 1,6-dimercapto hexane, 1,8-dimercapto decane, 2,3-dimercapto pentadecane, 1,6-dimercapto eicosane, 1,4-dimercapto-2-butene, 1,8-dimercapto-2-octene, dimercapto ethyl ether, dimercapto propyl ether, dimercapto dipropyl sulfide, dimercapto xylene, dimercapto diethoxy benzene, 1,3-dimercapto toluene, p-dimercapto benzene, dimercapto cyclohexane, dimercapto methylcyclohexane, 2,9-p-menthane dithiol, dimercapto alpha-terpinene, dimercapto phellandrene, dimercapto sylvestrene, 2,5-dimercapto pyridine, dimercapto thiophene, dimercapto p-dioxane, and the like.

Sufficient P(X)$_3$ is added to the dimercaptans to give from 0.5 to 10 mol percent cross-linking. The cross-linking agents will have the formula:

$$\text{HS—R—S—P—S—R—SH}$$
with pendant S—R—S—H wherein R is an organic radical containing up to 20 carbon atoms as previously defined.

Three molecules of dimercaptans react with one molecule of P(X)$_3$. The cross-linking agents are employed in an amount of from 0.5 to 10 mol percent of the total P(X)$_3$ and dithiol employed.

The cross-linking agents are connected one to another by one or more dimercaptans. When sulfur is used in the polymerization, from 2 to 5 sulfur atoms will link the alkyl radical together when the dimercaptans react with the cross-linking agents. When non-sulfur-containing oxidizing agents such as lead peroxide are used to react the mercaptan with the cross-linking agents, only two sulfur atoms are between each R group.

The oxidizing agent that can be used according to the invention includes free or elemental sulfur and sulfur-donor or sulfur-yielding compounds. Suitable sulfur-donor or sulfur-yielding compounds include thiuram polysulfides having the structural formula $$\text{R}_2\text{N—C(=S)—S}_x\text{—C(=S)—NR}_2$$

in which x is 2, 3 or 4, R represents an alkyl or cycloalkyl group containing up to and including 10 carbon atoms, and the R's attached to a terminal nitrogen atom can be joined to form with said nitrogen atom a heterocyclic structure.

Examples of such compounds are:
tetramethylthiuram disulfide,
tetraethylthiuram trisulfide,
tetraamylthiuram disulfide,
tetradecylthiuram disulfide,
tetraoctylthiuram disulfide,
tetracyclohexylthiuram disulfide,
dipentamethylenethiuram tetrasulfide, and the like.

Selenium dithiocarbamates of the formula

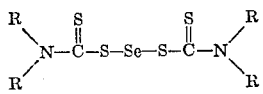

wherein the R groups represent alkyl or cycloalkyl radicals containing up to and including 10 carbon atoms, and the R's attached to a terminal nitrogen atom can be joined to form with said nitrogen a heterocyclic structure, can also be employed as the sulfur-yielding compounds.

Examples of such compounds are:
selenium dimethyl dithiocarbamate,
selenium diethyl dithiocarbamate,
selenium didecyldithiocarbamate,
selenium dioctyldithiocarbamate,
selenium dinonyldithiocarbamate,
selenium dicyclohexyldithiocarbamate,
selenium pentamethylenedithiocarbamate, and the like.

Other sulfur-donor compounds that can be used include N,N'-polythiodiamines of the formula

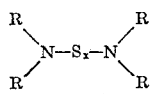

where $x$ is 2, 3 or 4, and R represents an alkyl or cycloalkyl group containing up to and including 10 carbon atoms, such radicals being purely hydrocarbon or substituted by cyano groups. The R groups can be joined to form heterocyclic structures which include the nitrogen atom, such heterocyclic structures being joined by juncture of alkyl groups or inclusive of oxygen, sulfur or nitrogen.

Examples of such compounds are:
N,N'-dithiobis(dibtuylamine),
N,N'-trithiobis(dihexylamine),
N,N'-dithiobis(dioctylamine),
N,N'-dithiobis(didecylamine),
N,N'-dithiobis(morpholine),
N,N'-dithiobis(thiamorpholine),
N,N'-dithiobis(piperidine),
N,N'-dithiobis(piperazine),
N,N'-dithiobis-(n-butylaminoacetonitrile),
N,N'-dithiobis-(beta-ethylaminopropionitrile),
N,N'-tetrathiobis(octyl-6-cyanooctylamine),
N,N'-tetrathiobis(octyl-6-cyanooctylamine),
N,N'-dithiobis(dicyclohexylamine),
N,N'-dithiobis(decyl-5-cyanoamylamine),
N,N'-trithiobis-(hexyl-9-cyanononylamine),
N,N'-dithiobis(n-butylaminopropionitrile), and the like.

Another class of compounds suitable for the purposes of the present invention are the thiazyl sulfides, including mercaptobenzothiazole, zinc 2-mercaptobenzothiazole, cupric 2-mercaptobenzothiazole, benzothiazyl disulfide, and the like.

An additional class of compounds suitable for the purposes of the invention include the disulfides of the general formula R—$S_x$—R in which $x$ is 2, 3 or 4 and R is an alkyl or cycloalkyl group containing from 1 to 16 carbon atoms.

Typical examples of such compounds are:
dimethyl disulfide,
diethyl disulfide,
di-n-propyl disulfide,
diisopropyl disulfide,
diamyl disulfide,
dicyclohexyl disulfide,
dioctyl disulfide,
didecyl disulfide,
ditetradecyl disulfide,
dihexadecyl trisulfide, and the like.

The ratio of sulfur to dimercaptan employed will vary appreciably but will generally be at least 2 mols of sulfur per mol of mercaptan. It is preferred to employ a mol ratio of sulfur to mercaptan in the range of 2 to 5 mols of sulfur per mol of mercaptan.

The reaction between the dimercaptan and sulfur is ordinarily carried out at an elevated temperature. Generally speaking, it is desirable to operate at a temperature high enough to maintain the sulfur in a molten condition. The actual temperatures employed will depend upon the mercaptan being reacted and the product desired. In general, however, the temperature will range from about 0 to about 500° F., preferably from about 150 to about 300° F.

The pressure at which the reaction is carried out will depend upon the mercaptan being reacted and the reaction diluent, as well as other process variables. Generally speaking, this pressure is sufficient to maintain the reactants substantially in the liquid phase. In general, however, the pressure will range from 0 to about 100 p.s.i.g., preferably from 0 to about 15 p.s.i.g. The reaction time will vary appreciably but ordinarily will range from about 0.25 to about 10 hours, preferably from about 1 to about 2 hours.

Catalysts suitable for the purpose of this invention include those compounds having an alkaline reaction such as oxides and hydroxides of the alkali metals, alkali metal sulfides, ammonia, amines, etc., but the amines are preferred for their solubility in the reaction mixture. Representative examples of suitable amines that can be employed include mono-, di- and trialkyl amines having up to about 6 carbon atoms in each alkyl group, such as monoethanolamine, diethanolamine, triethanolamine, di-n-butylamine, tri-n-butylamine, dibenzylamine, tetramethylene-penta-amine, the guanidines such as diphenyl guanidine, and the like. Another group of catalysts that can be employed include the alkali metal sulfides, especially sodium and potassium sulfides. These latter materials are preferably employed in the presence of a small amount of an alcohol such as methanol.

The amount of catalyst employed in carrying out the invention can vary appreciably but will generally range from 0.5 to 5 weight percent of the reaction mixture, preferably from about 1 to about 2 weight percent of the reaction mixture.

The process of this invention is preferably carried out in the presence of an inert diluent. Diluents suitable for use in the process are hydrocarbons which are not detrimental to the oxidation reaction. Such diluents include aromatics, such as benzene, toluene, xylene, ethylbenzene and mixtures thereof. It is also within the scope of the invention to use straight and branched chain paraffins containing up to and including 10 carbon atoms per molecule. Examples of suitable paraffins include propane, n-butane, n-pentane, isopentane, n-hexane, isohexane, 2,2,4-trimethylpentane (isooctane) n-decane and the like. Mixtures of these paraffinic hydrocarbons also can be employed as diluents in conducting the process of the invention. Cycloparaffins such as cyclohexane and methylcyclohexane can also be used. Also, mixtures of any of the aforementioned hydrocarbons can be employed as the diluent. The amount of diluent employed will vary appreciably and can range as high as 90 to 95 percent of the reaction mixture when desired.

Numerous variations in operative procedure can be followed. The dimercaptan compound or mixtures thereof reacted with P(X)₃ are contacted with free sulfur or a sulfur-yielding compound in the presence of a basic catalyst under suitable reaction conditions as set forth above. The reaction of this invention can be conducted in a manner like those of the prior art and can be effected in a batch, intermittent, or continuous manner.

The properties of the polymeric products obtained will vary appreciably. The amount of sulfur present in the polymeric product generally will range from about 30 to about 60 weight percent. The polymers produced can be compounded by any known means such as have been used in the past for compounding polysulfide polymers. Vulcanization accelerators, reinforcing agents and fillers such as normally employed in polysulfide rubbers can likewise be employed in the compounds of this invention.

The polymers obtained by the invention have utility in applications wherein both natural and synthetic rubbers are used, for example in the manufacture of automobile tires, gaskets and other rubber articles. The polymer compositions of the invention prior to curing can be applied to a base to coat same and therefore are also useful as caulking compounds, linings for fuel tanks, and the like.

The polysulfide polymers of the invention can be cured by the use of such curing agents as zinc peroxide, hydrogen peroxide, p-quinone dioxime, lead peroxide, dibutylphthalate, stearic acid, zinc chromate, lead chromate, cumene hydroperoxide, benzoyl peroxide, lauroyl peroxide, naphthenates of metals such as copper, lead, zinc, etc., and mixtures or combinations of these curing agents. By the use of the proper curing agent, the polymer can be cured either at room temperature or with mild heat.

A better understanding of the invention will be obtained upon reference to the following illustrative example, which is not intended, however, to be unduly limitative of the invention.

EXAMPLE

Polysulfide polymers were prepared by reacting 2,9-p-menthane dithiol, sulfur and $PCl_3$. In this run, 11 grams of $PCl_3$ was slowly added to a 2-liter reactor containing 400 grams of benzene diluent and 460 grams of 2,9-p-menthane dithiol. The resulting mixture was heated to 120° F. until there was no further evolution of HCl. Two grams of diphenyl guanidine catalyst was added. Forty-eight grams of sulfur was added to the reaction mixture slowly over a period of about 30 minutes so as to keep the reaction mixture from boiling over due to rapid evolution of $H_2S$. After evolution of $H_2S$ stopped, the benzene solution of polymer was heated to a temperature of approximately 200° F. at about 20 mm. Hg absolute pressure to remove the last traces of benzene solvent. The product obtained had a viscosity of 95 poises at 77° F.

The above viscous polymers are useful as caulking compounds, lacquers, and plastics and may be used as additives for each of these. They also may be employed as additives for lube oil, grease, and the like.

As will be evident to those skilled in the art, various modifications of this invention can be practiced in view of the foregoing disclosure. Such variations and modifications are believed clearly to come within the spirit and scope of the invention.

I claim:
1. A process for the production of a cross-linked polysulfide polymer which comprises (1) contacting an organic dimercaptan of the formula HS—R—SH, wherein R is a hydrocarbon radical having up to and including 20 carbon atoms per molecule with $P(halide)_3$ at a temperature in the range of 100 to 140° F., (2) adding to the resulting reaction medium an oxidizing agent selected from the group consisting of free sulfur, elemental sulfur, sulfur-donor and sulfur-yielding compounds in a mol ratio of said oxidizing agent to dimercaptan in the range of 2/1 to 5/1 in the presence of a basic catalyst at a temperature in the range of 0 to 500° F. to form said polymer and (3) recovering said polymer as a product of the process.

2. A process according to claim 1 wherein said dimercaptan is a cyclic hydrocarbon dimercaptan.

3. A process according to claim 1 wherein said catalyst is selected from the group consisting of alkyl amines and alkali metal sulfides.

4. The cross-linked polysulfide polymer of claim 1.

5. A process for the production of a polysulfide polymer which comprises contacting a dimercaptan compound having the structural formula HS—R—SH, wherein R is a hydrocarbon radical having up to and including 20 carbon atoms per molecule, with $PCl_3$ at a temperature in the range of 100 to 140° F., thereafter adding a material selected from the group consisting of free sulfur and sulfur-yielding compounds in a mol ratio of said sulfur material to dimercaptan in the range 2/1 to 5/1 in the presence of a catalytic amount of a basic catalyst at a temperature in the range of 0 to 500° F., said contacting being effected in an inert hydrocarbon diluent, and recovering said polymer as a product of the process.

6. A process according to claim 5 wherein curing agents incorporated into said recovered polymer and said polymer is then subjected to curing conditions.

7. The cured product of claim 6.

8. The process according to claim 5 wherein said dimercaptan is 2,9-p-menthane dithiol and said catalyst is diphenyl guanidine.

9. A process for producing a novel cross-linked polysulfide polymer which comprises contacting 2,9-p-menthane dithiol with $PCl_3$ at a temperature of 100 to 140° F., thereafter adding free sulfur in a mol ratio of sulfur to dithiols in the range of 2/1 to 5/1 in the presence of a basic catalyst at a temperature in the range of 0 to 500° F., said contacting being effected in benzene as the reaction medium, and recovering said polymer as a product of the process.

10. The cross-linked product of claim 9.

No references cited.

JOSEPH L. SCHOFER, *Primary Examiner.*

D. K. DENENBERG, *Assistant Examiner.*